US012596624B2

(12) United States Patent
Pande et al.

(10) Patent No.: US 12,596,624 B2
(45) Date of Patent: Apr. 7, 2026

(54) SYSTEM POWER MANAGEMENT OF DEVICES COUPLED TO A PORT OF AN INFORMATION HANDLING SYSTEM BY IDENTIFYING ASSOCIATED CONTEXTUAL DATA

(71) Applicant: Dell Products L.P., Round Rock, TX (US)

(72) Inventors: Pankaj Pande, Carlingford (AU); Nikhil Manohar Vichare, Austin, TX (US); Chen-Hsin Chang, Keelung City (TW)

(73) Assignee: Dell Products L.P., Round Rock, TX (US)

( * ) Notice: Subject to any disclaimer, the term of this patent is extended or adjusted under 35 U.S.C. 154(b) by 273 days.

(21) Appl. No.: 18/489,326

(22) Filed: Oct. 18, 2023

(65) Prior Publication Data

US 2025/0130913 A1 Apr. 24, 2025

(51) Int. Cl.
| | |
|---|---|
| *G06F 13/00* | (2006.01) |
| *G06F 1/26* | (2006.01) |
| *G06F 11/30* | (2006.01) |
| *G06F 13/40* | (2006.01) |

(52) U.S. Cl.
CPC .......... *G06F 11/3051* (2013.01); *G06F 1/266* (2013.01); *G06F 13/4068* (2013.01)

(58) Field of Classification Search
CPC .. G06F 11/3051; G06F 1/266; G06F 13/4068; G06F 13/00
See application file for complete search history.

(56) References Cited

U.S. PATENT DOCUMENTS

| | | | | |
|---|---|---|---|---|
| 11,533,311 | B2 * | 12/2022 | Schmitt | G06F 9/5072 |
| 11,924,230 | B2 * | 3/2024 | Mahaffey | G06F 11/3006 |
| 2017/0161053 | A1 * | 6/2017 | Hayakawa | G06F 9/44536 |
| 2020/0387357 | A1 * | 12/2020 | Mathon | G06F 9/4411 |

* cited by examiner

*Primary Examiner* — Tammara R Peyton
(74) *Attorney, Agent, or Firm* — McDermott Will & Schulte LLP

(57) ABSTRACT

Managing devices connected to an IHS, including performing, at a first time, a calibration and configuration of a device management model, including: identifying contextual data associated with a device coupled to a port of the IHS; training, based on the contextual data, the device management model, including generating a configuration policy including configuration rules, the configuration rules for performing computer-implemented actions to automatically adjust power provided to the device and functionality enablement of the device; performing, at a second time, a steady-state management of the device, including: monitoring the contextual data associated with the device; and in response, i) accessing the device management model including the configuration policy, ii) identifying one or more of the configuration rules based on the monitored contextual data, and iii) applying the one or more configuration rules to perform computer-implemented actions to automatically adjust power provided to the device and functionality enablement of the device.

20 Claims, 4 Drawing Sheets

SYSTEM POWER MANAGEMENT OF DEVICES COUPLED TO A PORT OF AN INFORMATION HANDLING SYSTEM BY IDENTIFYING ASSOCIATED CONTEXTUAL DATA

BACKGROUND

Field of the Disclosure

The disclosure relates generally to an information handling system, and in particular, managing devices coupled to the information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As USB Type-C connecters gain popularity in the market, compatibility issues of such with information handling systems arise due to the vast array of Type-C dongles, docks, Type-C monitors, and other Type-C devices.

SUMMARY

Innovative aspects of the subject matter described in this specification may be embodied in a method of managing devices connected to an information handling system, including performing, at a first time, a calibration and configuration of a device management model, including: identifying contextual data associated with a device coupled to a port of the information handling system, the contextual data including i) historical data of the device, ii) customer incident (CID) issues associated with the device, and iii) user behavior patterns associated with the device; training, based on the contextual data, the device management model, including generating a configuration policy including configuration rules, the configuration rules for performing computer-implemented actions to automatically adjust power provided to the device and functionality enablement of the device; performing, at a second time, a steady-state management of the device, including: monitoring the contextual data associated with the device; and in response to monitoring the contextual data associated with the device, i) accessing the device management model including the configuration policy, ii) identifying one or more of the configuration rules based on the monitored contextual data, and iii) applying the one or more configuration rules to perform one or more of the computer-implemented actions to automatically adjust power provided to the device and functionality enablement of the device.

Other embodiments of these aspects include corresponding systems, apparatus, and computer programs, configured to perform the actions of the methods, encoded on computer storage devices.

These and other embodiments may each optionally include one or more of the following features. For instance, the historical data of the device includes one or more of a manufacturer of the device, a model of the device, electronic marker information of the device, and previous compatibility issues associated with the device. The CID issues associated with the device includes data indicating compatibility issues associated with the device, including dates associated with compatibility issues, device identification numbers associated with the compatibility issues, and failure types associated with the compatibility issues. The user behavior patterns associated with the device include one or more of an usage frequency of the device, computer-executable application utilized with the device, and historical coupling of the device with the information handling system. The configuration rules further include configuration rules for performing computer-implemented actions to automatically shut down the device and electrically decoupling of the device from the port. Applying the one or more configuration rules further includes applying the one or more configuration rules to perform one or more of the computer-implemented actions to automatically shut down the device and electrically decoupling of the device from the port. Training the device management model further includes training a decision tree machine learning (ML) algorithm, and identifying the one or more of the configuration rules includes implementing the decision tree ML algorithm. Updating a database to indicate an association between the monitored contextual data associated with the device and computer implemented actions taken at the device The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
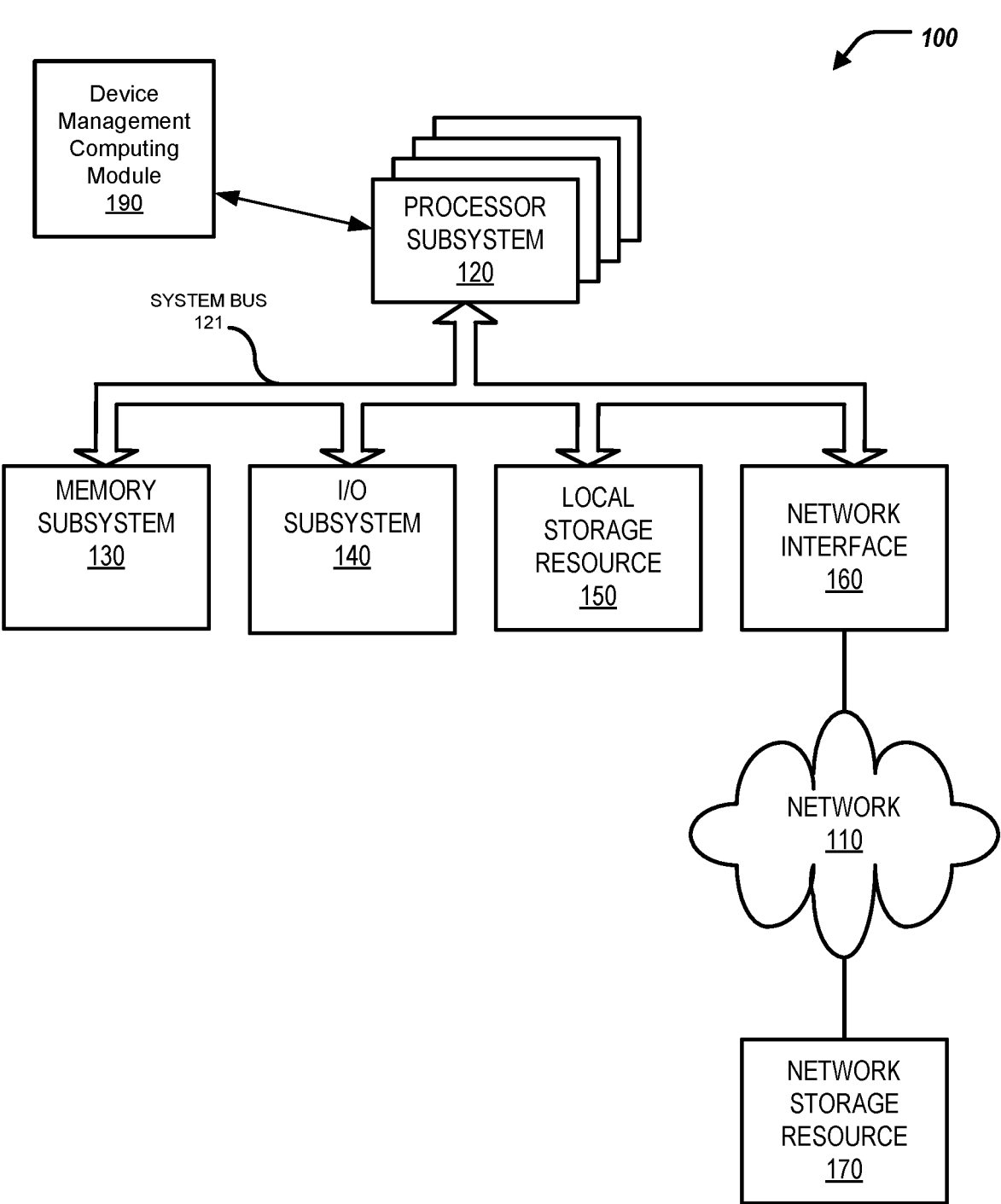
FIG. 1 is a block diagram of selected elements of an embodiment of an information handling system.

This disclosure discusses methods and systems for managing devices coupled to an information handling system to address compatibility issues of the devices and protection of the information handling system from damage. Machine learning (ML) based on contextual data associated with the device can be implemented to categorize a risk level of the device. Actions can be taken based on the risk level of the device, such as management power at the device and restricting functionalities of the device, described further herein.

Specifically, this disclosure discusses a system and a method for managing devices connected to an information handling system, including performing, at a first time, a calibration and configuration of a device management model, including: identifying contextual data associated with a device coupled to a port of the information handling system, the contextual data including i) historical data of the device, ii) customer incident (CID) issues associated with the device, and iii) user behavior patterns associated with the device; training, based on the contextual data, the device management model, including generating a configuration policy including configuration rules, the configuration rules for performing computer-implemented actions to automatically adjust power provided to the device and functionality enablement of the device; performing, at a second time, a steady-state management of the device, including: monitoring the contextual data associated with the device; and in response to monitoring the contextual data associated with the device, i) accessing the device management model including the configuration policy, ii) identifying one or more of the configuration rules based on the monitored contextual data, and iii) applying the one or more configuration rules to perform one or more of the computer-implemented actions to automatically adjust power provided to the device and functionality enablement of the device.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-4 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

The information handling system 100 can also include a device management computing module 190. The device management computing module 190 can be in communication with the processor subsystem 120, or included by the processor subsystem 120. In some examples, the device management computing module 190 is included by an embedded controller (EC) of the information handling system 100.

Figure 2:
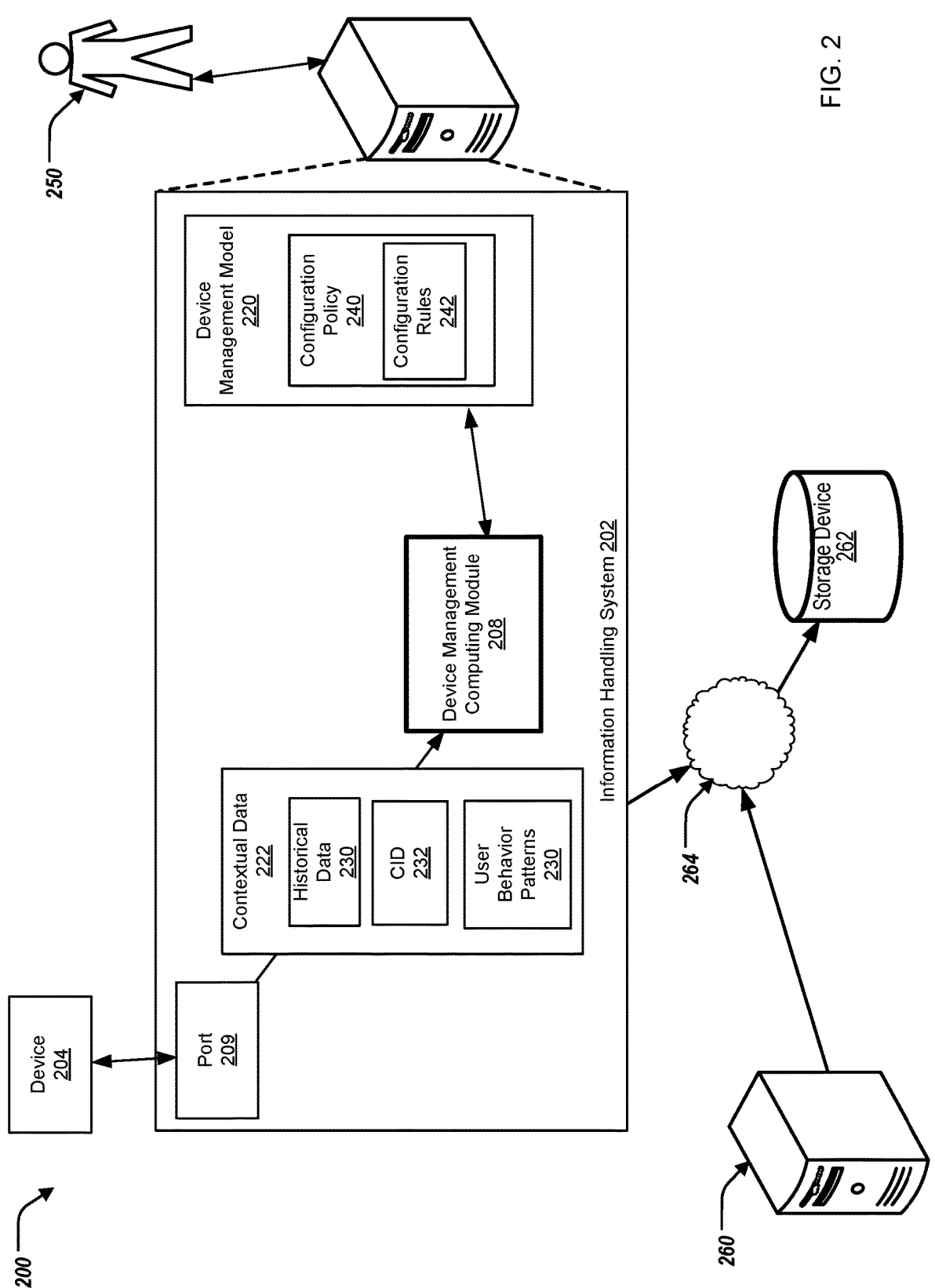
FIG. 2 illustrates a block diagram of an information handling system for managing devices coupled to the information handling system.

Turning to FIG. 2, FIG. 2 illustrates an environment 200 including an information handling system 202 and a device 204. The information handling system 202 can include a device management computing module 208 and a port 209. In some examples, the information handling system 202 is similar to, or includes, the information handling system 100 of FIG. 1.

The environment 200 can further include an additional information handling system 260, a storage device 262, and a network 264.

In some examples, the information handling system 202 is the same, or substantially the same, as the information handling system 100 of FIG. 1. In some examples, the device management computing module 208 is the same, or substantially the same, as the magnification management computing module 190 of FIG. 1.

The information handling system 202 can be in communication with the device 204 utilizing the port 209. That is, the device 204 can be electronically, physically, and power coupled to the information handling system 202 and the port 209. In some examples, the device 204 is an Universal Serial Bus (USB) device. In some examples, the device 204 is a USB Type-C device, such as a USB Type-C dongle, USB Type-C dock, USB Type-C monitor. In some examples, the port 209 is a USB port. In some examples, the port 209 is a USB Type-C port.

The information handling system 202 can be in communication with the storage device 264 over the network 264. The additional information handling system 260 can be in communication with the storage device 264 over the network 264.

In short, the device management computing module 208 can manage the device 204 to address compatibility issues of the device 204 and protection of the information handling system 202 for damage. The device management computing module 208 can leverage machine learning (ML) based on contextual data associated with the device 204 to categorize a risk level of the device 204. The device management computing module 208 can then take actions based on the risk level of the device 204, such as management power at the device 204 and restricting functionalities of the device 204, described further herein.

In some implementations, the device management computing module 208 can manage devices connected to the information handling system 202, including managing the device 204 and the connection/coupling of the device 204 with the information handling system 202 and with the port 209. Specifically, the device management computing module 208 can perform a calibration and a configuration of the device management model 220. Performing of the calibration and the configuration of the device management model 220 can include identifying contextual data 222 associated with the device 204 and/or the port 209.

Specifically, the device management computing module 208 can receive the contextual data 222 associated with the device 204 through the port 209. The device 204 can provide the contextual data 222 in response to a request from the device management computing module 208, or automatically. In some examples, the device 204 can provide the contextual data 222 to the device management computing module 208 periodically, e.g., every 1 millisecond, 1 second. In some examples, the device 204 can provide the contextual data 222 upon initial coupling of the device 204 with the port 209. In some examples, the device 204 can provide the contextual data 222 in response to user input from a user 250 of the information handling system 202.

In some examples, the contextual data 222 includes historical data of the device 204. For example, the historical data of the device 204 can include a manufacturer of the device 204. For example, the historical data of the device 204 can include a model of the device 204. For example, the historical data of the device 204 can include electronic marker (e-marker) information of the device 204, such as power and data capabilities of the device 204. For example, the historical data of the device 204 can include previous compatibility issues associated with the device, such as a record of previous compatibility issues and associated resolutions.

In some examples, the contextual data 222 includes customer incident (CID) issues associated with the device 204. For example, the CID issues associated with the device 204 can include data indicating compatibility issues associated with the device 204. For example, the data indicating the compatibility issues associated with the device 204 can include dates associated with the compatibility issues associated with the device 204, device identification numbers (device IDs) associated with the compatibility issues associated with the device 204, and failure types associated with the compatibility issues associated with the device 204. For example, the CID issues associated with the device 204 can include descriptive data of the device 204, such as USB Type-C accessories.

In some examples, the contextual data 222 includes user behavior patterns associated with the device 204. That is, the contextual data 222 includes user behavior patterns of the user 250 associated with the device 204. For example, the user behavior patterns associated with the device 204 can include usage frequency of the device 204. For example, the user behavior patterns associated with the device 204 can include types of computer-executable applications that are executed that utilize the device 204. For example, the user behavior patterns associated with the device 204 can include a historical successful connection/coupling of the device 204 to the information handling system 202.

The device management computing module 208 can train, based on the contextual data 222, the device management model 220. Specifically, the magnification management computing module 206 can generate, based on the contextual data 222 identified at the first time, a configuration policy 240 that includes configuration rules 242. In some examples, the configuration rules 242 are rules for automatically performing computer-implemented actions to automatically adjust power provided to the device 204 and functionality enablement of the device 204. In some examples, the configuration policy 240 can be referred to as a "risk level" configuration policy of the device 204.

To that end, the device management computing module 208 can train the device management model 220 to establish connections between the contextual data 222 and the configuration rules 242. Specifically, the device management model 220 can identify one or more configurations rules 242 to be applied based on a connection with one or more of the contextual data 222.

In some examples, the device management computing module 208 can train the device management model 220 using a machine learning (ML) process, and/or a neural network. In some examples, the device management computing module 208 can train the device management model 220 that includes a decision tree machine learning (ML) algorithm, described further with respect to FIG. 3. In some examples, the device management model 220 includes a gradient bosting ML classifier. In some examples, the device management model 220 includes an extreme gradient boosting (XGBoost) ML classifier.

In some examples, the configuration rules 216 can include computer-implemented actions for automatically adjusting the power provided to the device 204 by the information handling system 202 and the port 209. For example, the configuration rules 216 can include adjusting the power provided to the device 204 and the voltage levels at the port 209. For example, the configuration rules 216 can include limiting the power provided to the device 204. For example, the configuration rules 216 can include providing power to the device 216 to ensure operation of the device 204 without exceeding safe limits.

In some examples, the configuration rules 216 include computer-implemented actions for automatically adjusting the functionality enablement of the device 204 by the information handling system 202 and the port 209. For example, the configuration rules 216 can include enabling partial functionality of features of the device 204. For example, the configuration rules 216 can include blocking functionality of features of the device 204. For example, the configuration rules 216 can include limiting or blocking high-speed data transfer of the device 204 to the information handling system 202. For example, the configuration rules 216 include limiting or blocking video output of the device 204.

In some examples, the configuration rules 216 include computer-implemented actions for automatically shutting down the device 204 and/or electrically decoupling the device 204 from the port 209. For example, the configuration rules 216 can include automatically powering down the device 204 and/or disconnecting the device 204 from the port 209.

In some examples, the configuration rules 216 include computer-implemented actions for providing a notification to the information handling system 202 and/or the user 250. For example, the notification can be provided for display on a display device coupled to the information handling system 202, and/or provided for display on a display device of a secondary computing device associated with the user 250, such as a smartphone, smart tablet, or smart watch. In some examples, the notification can indicate potential risks of coupling the device 204 with the information handling system 202, including possible incompatibilities or potential harm to the information handling system 202 when the device 204 is coupled with the information handling system 202 through the port 209.

The device management computing module 208 can perform, at a second time (after the first time), a steady-state management of the device 204. Specifically, the device management computing module 208 can monitor the contextual data 222.

In some implementations, the device management computing module 208 can, in response to monitoring the contextual data 222 associated with the device 204, accesses the device management model 220 including the configuration policy 240. The device management computing module 208 can further identify one or more of the configuration rules 242 based on the monitored contextual data 222. Furthermore, the magnification management computing module 206 can apply the configuration rules 242 to the device 204 and/or the port 209. In other words, the device management computing module 208 can apply appropriate configuration rules 242 based on the monitored contextual data 222 associated with the device 204. In some examples, the device management computing module 208 can apply the configuration rules 242 to perform one or more of the computer-implemented actions to automatically adjust power provided to the device 204 and functionality enablement of the device 204.

For example, the device management computing module 208 can monitor the contextual data 222 and determine that the contextual data 222 indicates a particular combination of historical data of the device 204, CID issues associated with the device 204, and user behavior patterns associated with the device 204. In response, the device management computing module 208 can access the device management model 220, identify the configuration rules 242 that are applicable to the particular combination of historical data of the device 204, CID issues associated with the device 204, and user behavior patterns associated with the device 204, and apply such configuration rules 242. For example, the device management computing module 208 can apply configuration rules 242 to adjust power provided to the device 204 and functionality enablement of the device 204. Thus, by limiting power and restricting certain functionalities of the device 204, damage to the information handling system 202 can be minimized, and/or prevented by the device 204.

In some examples, applying the configuration rules 242 can include performing computer-implemented actions to automatically shut down (power down) the device 204 and electrically decouple the device 204 from the port 209.

In some examples, the device management computing module 208 can perform the steady-state management of the device 204 iteratively.

Figure 3:
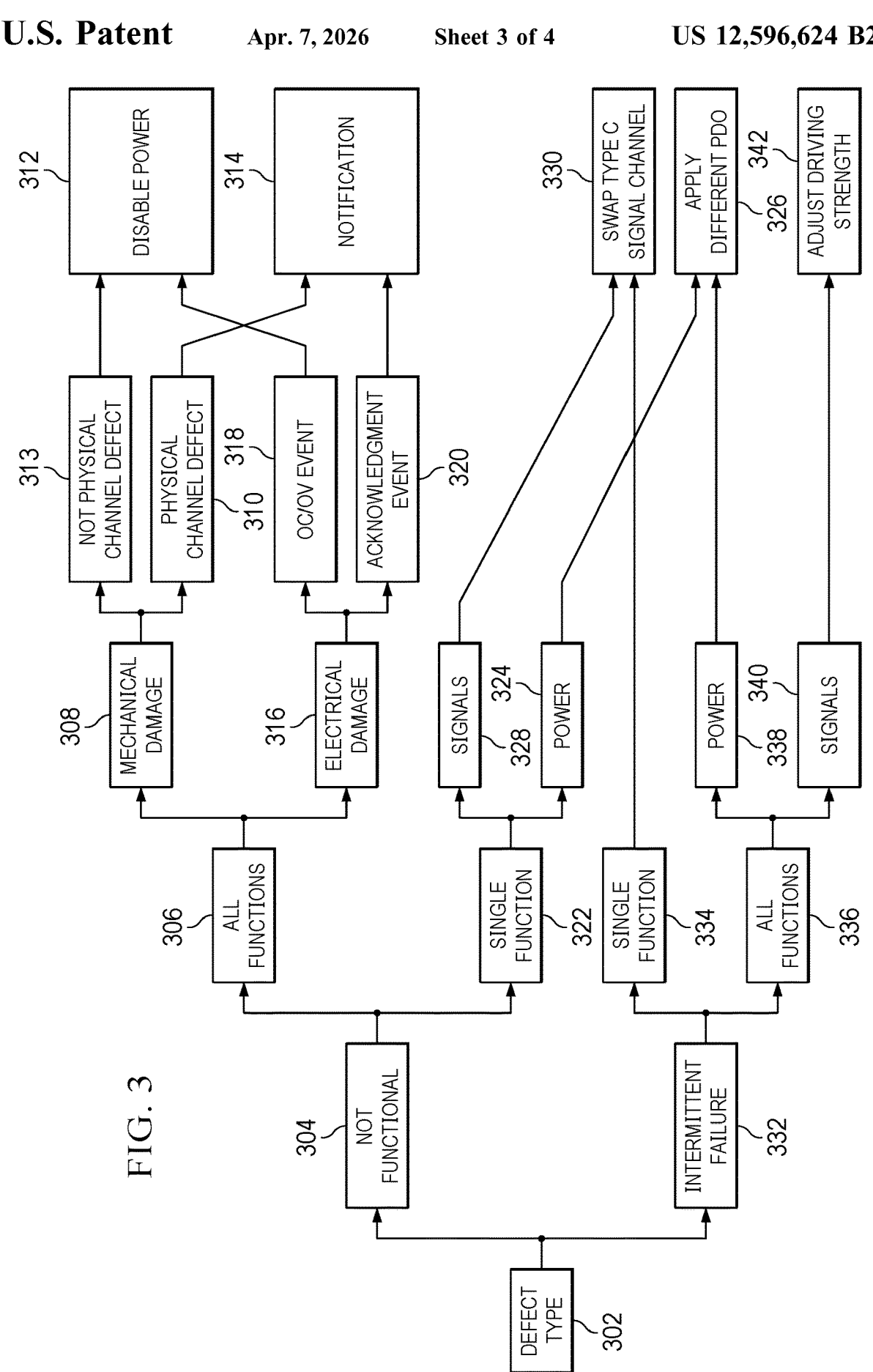
FIG. 3 illustrates a decision tree for machine learning for management of devices coupled to the information handling system.

In some examples, the device management computing module 208 can identify the configuration rules 242 based on the monitored contextual data 222 by implementing the decision tree ML algorithm, described further with respect to FIG. 3.

In some examples, the information handling system 202 can provide data to the database 262 (through the network 264) indicating an association between the monitored contextual data 222 associated with the device 204 and computer-implemented actions taken at the device 204 in response. That is, anytime an action is taken by the device management computing module 208 that applies appropriate configuration rules 242 based on the monitored contextual data 222 associated with the device 204, the information handling system 202 can provide (upload) data to the database 262 indicating the configuration rules 242 that were applied for which monitored contextual data 222 for the device 204. Thus, the database 262 is a dynamic device compatibility database that can be updated for the device 204 (and similar or new devices) and user behavior data.

In some examples, the additional information handling system 260 can access the storage device 262 though the network 264. Thus, when a device (not shown) similar to the device 204 is connected/coupled to the additional information handling system 260, the additional information handling system 260 can access the database 262 when performing steady state management of the device 204.

In some examples, the database 262 can maintain separate data collections for different categories of device types (e.g., dongle, dock, adapter). In some examples, the database 262 can maintain separate data collections by attributes of the device 204 (e.g., manufacturer, model, c-marker information).

FIG. 3 illustrates a decision tree used training the ML algorithm of the device management model 220 and for implementation of the device management model 220. In some examples, at 302, the device management computing module 208 receives data indicating a defect type associated with the device 204. At 304, the device management computing module 208 identifies the defect type as non-functional; at 306, that the defect type affects all functions; at 308, that the defect is associated with mechanical damage; at 310, that the defect is a physical channel defect (with CC pin data); and at 312, generates the configuration rule 242 to provide the notification.

In some examples, at 302, the device management computing module 208 receives data indicating a defect type associated with the device 204. At 304, the device management computing module 208 identifies the defect type as non-functional; at 306, that the defect type affects all functions; at 308, that the defect is associated with mechanical damage; at 313, that the defect is not a physical channel defect (without CC pin data); and at 314, generates the configuration rule 242 to disable power to the device 204.

In some examples, at 302, the device management computing module 208 receives data indicating a defect type associated with the device 204. At 304, the device management computing module 208 identifies the defect type as non-functional; at 306, that the defect type affects all functions; at 316, that the defect is associated with electrical damage; at 318, that the defect is associated with an over voltage/over current defect; and at 312, generates the configuration rule 242 to disable power to the device 204.

In some examples, at 302, the device management computing module 208 receives data indicating a defect type associated with the device 204. At 304, the device management computing module 208 identifies the defect type as non-functional; at 306, that the defect type affects all functions; at 316, that the defect is associated with electrical damage; at 320, that the defect is associated with an acknowledgement defect (not ACK data); and at 314, generates the configuration rule 242 to provide the notification.

In some examples, at 302, the device management computing module 208 receives data indicating a defect type associated with the device 204. At 304, the device management computing module 208 identifies the defect type as non-functional; at 322, that the defect type affects a single function; at 324, that the defect is associated with power at the device 204; at 326, generates the configuration rule 242 to apply a different power delivery object (PDO).

In some examples, at 302, the device management computing module 208 receives data indicating a defect type associated with the device 204. At 304, the device management computing module 208 identifies the defect type as non-functional; at 322, that the defect type affects a single function; at 328, that the defect is associated with signals;

and at 330, generates the configuration rule 242 to apply swap a type C signal channel.

In some examples, at 302, the device management computing module 208 receives data indicating a defect type associated with the device 204. At 332, the device management computing module 208 identifies the defect type as intermittent; at 334, that the defect type affects a single function; and at 300, generates the configuration rule 242 to apply swap a type C signal channel.

In some examples, at 302, the device management computing module 208 receives data indicating a defect type associated with the device 204. At 332, the device management computing module 208 identifies the defect type as intermittent; at 336, that the defect type affects all functions; at 338, that the defect is associated with power of the device 204; and at 326, generates the configuration rule 242 to apply a different power delivery object (PDO).

In some examples, at 302, the device management computing module 208 receives data indicating a defect type associated with the device 204. At 332, the device management computing module 208 identifies the defect type as intermittent; at 336, that the defect type affects all functions; at 340, that the defect is associated with signals at the device 204; and at 342, generates the configuration rule 242 to adjust driving strength (USB/HDMI).

Figure 4:
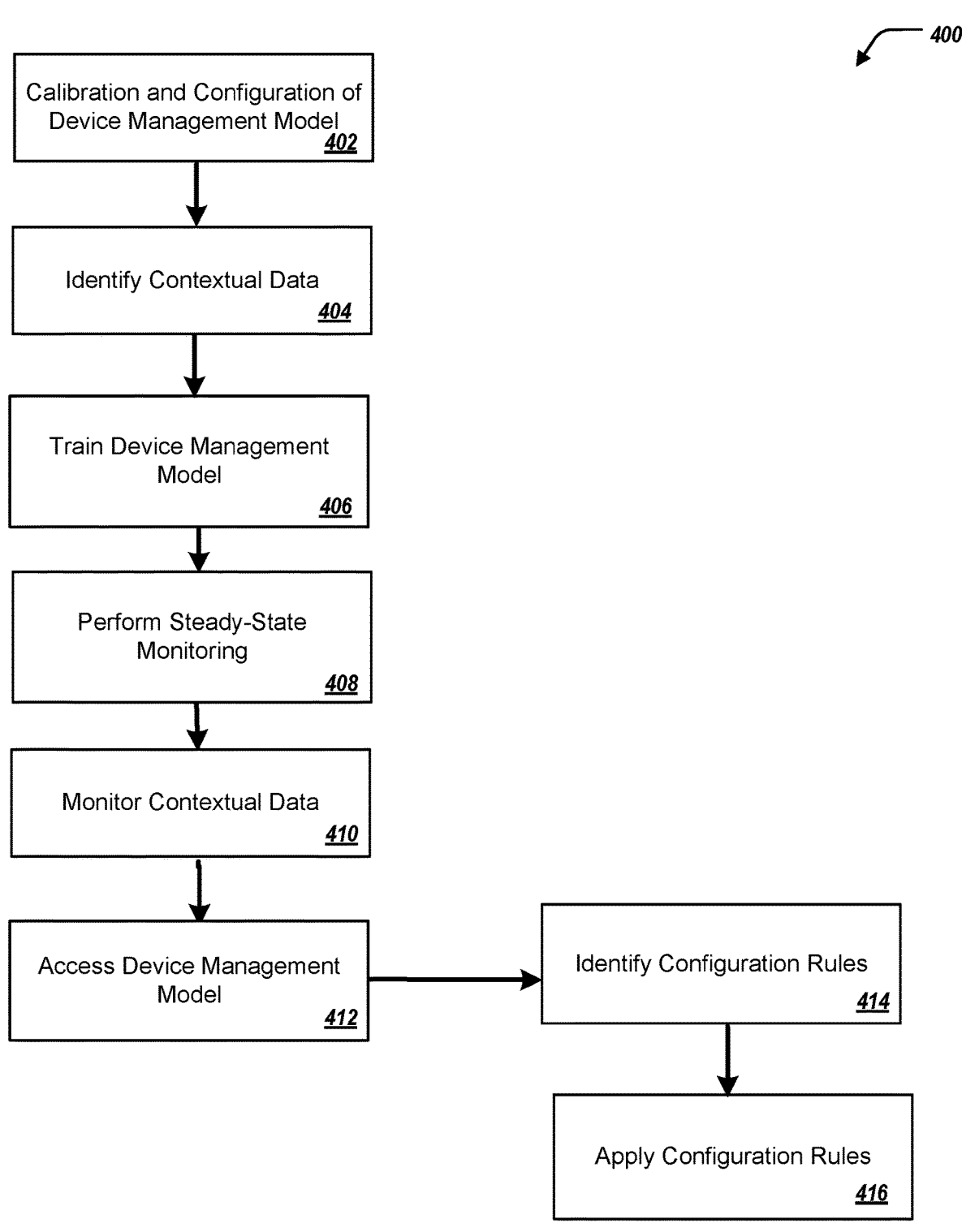
FIG. 4 illustrates a method for managing a devices coupled to the information handling system.

FIG. 4 illustrates a flowchart depicting selected elements of an embodiment of a method 400 for managing devices connected to an information handling system. The method 400 may be performed by the information handling system 100, the information handling system 202, and/or the device management computing module 208, and with reference to FIGS. 1-3. It is noted that certain operations described in method 400 may be optional or may be rearranged in different embodiments.

The device management computing module 208 can perform a calibration and a configuration of the device management model 220 (402). The device management computing module 208 can identify the contextual data 222 associated with the device 204 (404). The device management computing module 208 can train the device management model 220 (406). The device management computing module 208 can perform, at a second time (after the first time), a steady-state management of the device 204 (408). The device management computing module 208 can monitor the contextual data 222 associated with the device 204 (410). In some implementations, the device management computing module 208 can, in response to monitoring the contextual data 222, access the device management model 220 (412). The device management computing module 208 can identify one or more of the configuration rules 242 (414). The magnification management computing module 206 can apply the configuration rules 242 to the device 204 and/or the port 209 (418).

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method for managing devices connected to an information handling system, comprising:

performing, at a first time, a calibration and configuration of a device management model, including:

identifying contextual data associated with a device coupled to a port of the information handling system, the contextual data including i) historical data of the device, ii) customer incident (CID) issues associated with the device, iii) user behavior patterns associated with the device, a iv) a defect associated with the device;

training, based on the contextual data, the device management model, including generating a configuration policy including configuration rules, the configuration rules for performing computer-implemented actions to automatically adjust power provided to the device and functionality enablement of the device, including:

detecting characteristics of the defect, the characteristics including a failure type of the defect and a number of functions that are affected by the defect;

generating the configuration policy to include the configuration rules based on the characteristics of the defect for performing the computer-implemented actions to automatically adjust the power to the device and the functionality enablement of the device, the configuration rules including applying a different power delivery object (PDO) at the device, adjusting a power driving strength at the device, and swapping a signal channel at the device;

performing, at a second time, a steady-state management of the device, including:

monitoring the contextual data associated with the device; and in response to monitoring the contextual data associated with the device, i) accessing the device management model including the configuration policy, ii) identifying one or more of the configuration rules based on the monitored contextual data, and iii) applying the one or more configuration rules to perform one or more of the computer-implemented actions to automatically adjust power provided to the device and functionality enablement of the device.

2. The computer-implemented method of claim 1, wherein the historical data of the device includes one or more of a manufacturer of the device, a model of the device, electronic marker information of the device, and previous compatibility issues associated with the device.

3. The computer-implemented method of claim 1, wherein the CID issues associated with the device includes data indicating compatibility issues associated with the device, including dates associated with compatibility issues, device identification numbers associated with the compatibility issues, and failure types associated with the compatibility issues.

4. The computer-implemented method of claim 1, wherein the user behavior patterns associated with the device include one or more of an usage frequency of the device, computer-executable application utilized with the device, and historical coupling of the device with the information handling system.

5. The computer-implemented method of claim 1, wherein the configuration rules further include configuration rules for performing computer-implemented actions to automatically shut down the device and electrically decoupling of the device from the port.

6. The computer-implemented method of claim 5, wherein applying the one or more configuration rules further includes applying the one or more configuration rules to perform one or more of the computer-implemented actions to automatically shut down the device and electrically decoupling of the device from the port.

7. The computer-implemented method of claim 1, wherein training the device management model further includes training a decision tree machine learning (ML) algorithm, and
wherein identifying the one or more of the configuration rules includes implementing the decision tree ML algorithm.

8. The computer-implemented method of claim 1, further including:
updating a database to indicate an association between the monitored contextual data associated with the device and computer implemented actions taken at the device.

9. An information handling system comprising a processor having access to memory media storing instructions executable by the processor to perform operations, comprising:
performing, at a first time, a calibration and configuration of a device management model, including:
identifying contextual data associated with a device coupled to a port of the information handling system, the contextual data including i) historical data of the device, ii) customer incident (CID) issues associated with the device, iii) user behavior patterns associated with the device, a iv) a defect associated with the device;
training, based on the contextual data, the device management model, including generating a configuration policy including configuration rules, the configuration rules for performing computer-implemented actions to automatically adjust power provided to the device and functionality enablement of the device, including:
detecting characteristics of the defect, the characteristics including a failure type of the defect and a number of functions that are affected by the defect;
generating the configuration policy to include the configuration rules based on the characteristics of the defect for performing the computer-implemented actions to automatically adjust the power to the device and the functionality enablement of the device, the configuration rules including applying a different power delivery object (PDO) at the device, adjusting a power driving strength at the device, and swapping a signal channel at the device;
performing, at a second time, a steady-state management of the device, including:
monitoring the contextual data associated with the device; and
in response to monitoring the contextual data associated with the device, i) accessing the device management model including the configuration policy, ii) identifying one or more of the configuration rules based on the monitored contextual data, and iii) applying the one or more configuration rules to perform one or more of the computer-implemented actions to automatically adjust power provided to the device and functionality enablement of the device.

10. The computer-implemented method of claim 9, wherein the historical data of the device includes one or more of a manufacturer of the device, a model of the device, electronic marker information of the device, and previous compatibility issues associated with the device.

11. The computer-implemented method of claim 9, wherein the CID issues associated with the device includes data indicating compatibility issues associated with the device, including dates associated with compatibility issues, device identification numbers associated with the compatibility issues, and failure types associated with the compatibility issues.

12. The computer-implemented method of claim 9, wherein the user behavior patterns associated with the device include one or more of an usage frequency of the device, computer-executable application utilized with the device, and historical coupling of the device with the information handling system.

13. The computer-implemented method of claim 9, wherein the configuration rules further include configuration rules for performing computer-implemented actions to automatically shut down the device and electrically decoupling of the device from the port.

14. The computer-implemented method of claim 13, wherein applying the one or more configuration rules further includes applying the one or more configuration rules to perform one or more of the computer-implemented actions to automatically shut down the device and electrically decoupling of the device from the port.

15. The computer-implemented method of claim 9, wherein training the device management model further includes training a decision tree machine learning (ML) algorithm, and
wherein identifying the one or more of the configuration rules includes implementing the decision tree ML algorithm.

16. The computer-implemented method of claim 9, the operations further including:
updating a database to indicate an association between the monitored contextual data associated with the device and computer implemented actions taken at the device.

17. A non-transitory computer-readable medium storing software comprising instructions executable by one or more computers which, upon such execution, cause the one or more computers to perform operations comprising:
performing, at a first time, a calibration and configuration of a device management model, including:

identifying contextual data associated with a device coupled to a port of the information handling system, the contextual data including i) historical data of the device, ii) customer incident (CID) issues associated with the device, iii) user behavior patterns associated with the device, a iv) a defect associated with the device;

training, based on the contextual data, the device management model, including generating a configuration policy including configuration rules, the configuration rules for performing computer-implemented actions to automatically adjust power provided to the device and functionality enablement of the device, including:

detecting characteristics of the defect, the characteristics including a failure type of the defect and a number of functions that are affected by the defect;

generating the configuration policy to include the configuration rules based on the characteristics of the defect for performing the computer-implemented actions to automatically adjust the power to the device and the functionality enablement of the device, the configuration rules including applying a different power delivery object (PDO) at the device, adjusting a power driving strength at the device, and swapping a signal channel at the device;

performing, at a second time, a steady-state management of the device, including:

monitoring the contextual data associated with the device; and in response to monitoring the contextual data associated with the device, i) accessing the device management model including the configuration policy, ii) identifying one or more of the configuration rules based on the monitored contextual data, and iii) applying the one or more configuration rules to perform one or more of the computer-implemented actions to automatically adjust power provided to the device and functionality enablement of the device.

18. The transitory computer-readable medium of claim 17, wherein the historical data of the device includes one or more of a manufacturer of the device, a model of the device, electronic marker information of the device, and previous compatibility issues associated with the device.

19. The transitory computer-readable medium of claim 17, wherein the CID issues associated with the device includes data indicating compatibility issues associated with the device, including dates associated with compatibility issues, device identification numbers associated with the compatibility issues, and failure types associated with the compatibility issues.

20. The transitory computer-readable medium of claim 17, wherein the user behavior patterns associated with the device include one or more of an usage frequency of the device, computer-executable application utilized with the device, and historical coupling of the device with the information handling system.

* * * * *